United States Patent [19]

Inoue

[11] Patent Number: 4,661,674
[45] Date of Patent: Apr. 28, 1987

[54] MINIMUM-IMPEDANCE CONDUCTOR ASSEMBLY FOR EDM

[75] Inventor: Kiyoshi Inoue, Tokyo, Japan

[73] Assignee: Inoue-Japax Research Incorporated, Japan

[21] Appl. No.: 650,104

[22] Filed: Sep. 13, 1984

[30] Foreign Application Priority Data

Sep. 14, 1983 [JP] Japan .................... 58-170123
Sep. 29, 1983 [JP] Japan .................... 58-149705[U]

[51] Int. Cl.⁴ .................... B23H 1/02; H01B 7/34; H05K 9/00
[52] U.S. Cl. .................... 219/69 C; 174/15 C; 174/32; 219/69 R
[58] Field of Search .................... 219/68, 69 R, 69 P, 219/69 C, 69 M; 174/15 C, 32, 113 AS, 117 AS, 15 WF

[56] References Cited

U.S. PATENT DOCUMENTS

| 290,375 | 12/1883 | Waring | 174/117 AS |
|---|---|---|---|
| 1,625,125 | 4/1927 | Latour | 174/32 |
| 2,145,182 | 1/1939 | Kirch | 174/15 C |
| 2,835,721 | 5/1958 | Leathers | 174/15 WF |
| 2,941,023 | 6/1960 | Tribe | 174/15 WF |
| 3,348,015 | 10/1967 | Rhyner et al. | 219/69 R |
| 3,461,218 | 8/1969 | Buchhold | 174/32 |
| 3,551,581 | 12/1970 | Goodman | 174/15 WF |
| 4,018,976 | 4/1977 | Grove | 174/15 WF |
| 4,105,860 | 8/1978 | Ball | 174/15 C |
| 4,163,887 | 8/1979 | Bühler | 219/69 P |
| 4,277,668 | 7/1981 | Inoue | 219/69 C |
| 4,310,718 | 1/1982 | Eng | 174/15 WF |
| 4,324,970 | 4/1982 | Nanasawa et al. | 219/69 W |
| 4,479,029 | 10/1984 | Banov et al. | 174/15 C |

FOREIGN PATENT DOCUMENTS

| 027040 | 3/1980 | European Pat. Off. | |
|---|---|---|---|
| 034477 | 8/1981 | European Pat. Off. | |
| 2341900 | 2/1975 | Fed. Rep. of Germany | 174/15 WF |
| 53-21493 | 2/1978 | Japan | 219/69 R |
| 56-76334 | 6/1981 | Japan | 219/69 W |
| 906695 | 9/1962 | United Kingdom | 174/32 |
| 2026921A | 2/1980 | United Kingdom | 219/69 R |
| 543985 | 5/1977 | U.S.S.R. | 174/15 WF |

OTHER PUBLICATIONS

"Developement of 22 kV Internally Water Cooled Cable System", by Hayashi et al., Patent Assoc. Lit., Nippon Cables Ltd., No. 60, pp. 37–46, 9/1975.

Primary Examiner—A. D. Pellinen
Assistant Examiner—Geoffrey S. Evans
Attorney, Agent, or Firm—Finnegan, Henderson, Farabow, Garrett & Dunner

[57] ABSTRACT

An EDM circuit arrangement incorporating a minimum-impedance electrical conductor assembly in a tubular form between an EDM pulse generator and a machining gap, the assembly having a first group of conductors connected between one terminal of the pulse generator and a tool electrode to conduct the machining pulses in one direction and a second group of conductors connected between the other terminal of the pulse generator to conduct the machining pulses in the opposite direction. An electrically nonconductive member contouring the tubular form and having these conductors mounted therein in mutually insulating and generally parallel and equally spaced relationship in an endless row, framing the tubular form, between its outer and surfaces and generally concentric therewith is provided. The conductors are arranged in such a manner that each of the conductors in the first group is axially aligned proximate with a conductor of the other group in the endless row.

9 Claims, 6 Drawing Figures

4,661,674

MINIMUM-IMPEDANCE CONDUCTOR ASSEMBLY FOR EDM

FIELD OF THE INVENTION

The present invention relates to electrical discharge machining (EDM) and, more particularly, to an EDM circuit arrangement incorporating a new and improved electrical conductor assembly for transmitting EDM current pulses from an EDM pulse generator to an EDM gap.

BACKGROUND OF THE INVENTION

The EDM process, now widely in use in industry, may be applied in various forms. For example, with "traveling-wire" EDM, a thin, continuous wire, tape or ribbon is employed as the tool electrode to form contours of various shapes in workpieces In "sinking38 EDM, a formed solid electrode may serve as the tool electrode to produce a cavity, which is complementary in shape thereto, in a workpiece. In "generic" EDM, a "non-formed" or generic electrode is constituted as the tool electrode moving in a scanning manner relative to the workpiece to form an intricate cavity or contour therein.

In the varying practical forms of EDM, it is a common requirement that the erosive current be furnished to the EDM gap as a succession of discrete, time-spaced current pulses, which can be created by pulsing a DC output by means of electronic switches or a capacitor. It has been found important that the current pulses be square or rectangular in waveform. For example, a workpiece must most often be "rough" machined. A "roughing" operation requires long current pulses whose duration or "on" time $\tau on$ ranges, say, in excess of 50 microseconds and often in the millisecond order. Given a particular mode of operation, it is important that "square" current pulses have a particular duration $\tau on$, a particular pulse interval $\tau off$ and a particular current level Ip established in a particular combination to yield a particular set of machining results (e.g. surface roughness, overcut, relative electrode wear and stock removal) desired for that particular operation. Thus, the need arises to be capable of obtaining any "square" roughing-mode pulse with parameters $\tau on$, $\tau off$ and Ip independently adjusted. This capability is indeed vital to a modern electroerosion generator as it is designed to apply a variety of rough and relatively rough machining operations.

With conventional EDM circuit arrangements, however, it has been found difficult to retain the squareness or rectangularity and the peak current of the EDM gap current pulses as desired. In these arrangements, the EDM pulses are produced in a unit (power supply or generator unit) provided separately from the machine proper which carries mechanical components and the work vessel in which the EDM gap is defined in the tool electrode and the workpiece. The separate power supply unit is adapted to package in its cabinet all principal electrical components required to produce at its output a succession of these pulses, the output of the unit being connected and hence the EDM pulses outgoing from the unit being transmitted to the machining gap by way of an elongated cable which must be provided. As a consequence, stray resistance and inductance included in the cable impede transmission of the shaped EDM pulses and act to cause a considerable loss of power and distortion of pulse waveform transmitted to the gap. Thus, there have been severe limitations in providing EDM pulses of greater Ip/$\tau on$ ratio.

These problems are even more serious in a "finish" machining operation required to achieve a finer EDM surface or to finish a rough EDM or otherwise machined workpiece. The finer the surface finish sought, the shorter must the pulse duration be, towards, and desirably into, the nanosecond order. Then, the greater the difficulty in retaining the squareness or rectangularity of erosive current pulses. Thus, when the pulse duration $\tau on$ must be as short as 10 microseconds or less, each pulse when delivered to the gap can at best be sinusoidal in its current-time characteristic, even when a most-advanced fine-pulsing erosion generator, either of switching or capacitor type, is employed. It has been found that the foregoing pulse transmission problems inherent in the prior art have severely hindered attempts to achieve improved results in the various ranges of the EDM process.

OBJECTS OF THE INVENTION

Accordingly, the present invention seeks to provide an improved EDM circuit arrangement whereby a succession of EDM current pulses formed in a generator or power supply can be transmitted to the gap without substantial distortion or power loss.

SUMMARY OF THE INVENTION

In accordance with the present invention there is provided an EDM circuit arrangement which comprises: an EDM pulse generator having a pair of terminals for providing a succession of EDM current pulses across a machining gap between a tool electrode and a workpiece; and a low-impedance electrical conductor assembly in a tubular form having an outer and an inner surface which are generally concentric with each other and in contact with a coolant fluid, the assembly comprising: a first group of electrical conductors connected between one of the said terminals and the tool electrode to conduct the current pulses in one direction; a second group of electrical conductors connected between the other of the said terminals and the workpiece to conduct the current pulses in the other direction; and an electrically nonconductive member contouring the said tubular form and having the said conductors mounted therein in a mutually insulating and generally parallel and equally spaced relationship in an endless row, framing the said tubular form, between the said outer and inner surfaces and generally concentric therewith, and arranged in such a manner that each of the said conductors in the said one group is axially aligned proximate with a conductor of the other group in the said endless row.

Specifically, the pulse generator may comprise a capacitor intermittently chargeable from a DC source for pulsing the output thereof to produce said succession of EDM current pulses. The DC source is accommodated in a power supply cabinet spaced from an EDM machining tool having the tool electrode and the workpiece accommodated therein, the capacitor being disposed in said machine tool and having the said pair of terminals connected via said conductor assembly with members energizing the tool electrode and the workpiece respectively.

Alternatively, the pulse generator may comprise a power switch and switching control circuit for pulsing the output of a DC source to produce a succession of voltage pulses eventually resulting in the succession of EDM current pulses. The pulse generator constituted by the power switch and the switching control circuit is disposed in a machine tool having the tool electrode and the workpiece accommodated therein while the DC source is accommodated in a power supply cabinet spaced from said machine tool. The pulse generator has the said terminals connected via the said conductor assembly with members energizing the tool electrode and the workpiece respectively.

The pulse generator in the machine tool may further comprise a capacitor chargeable by the voltage pulses and dischargeable through the EDM gap to produce the succession of EDM current pulses, the capacitor being electrically connected in series with the power switch and the DC source and having the said terminals connected via the said conductor assembly with the said terminals energizing the tool electrode and the workpiece respectively.

The tool electrode may be a wire-like electrode continuously traveling through said workpiece and energized by a pair of energizing members disposed in contact with the traveling wire-like electrode and at two opposite sides of the workpiece. Then, said conductors of the said first group in said assembly preferably comprises conductors of a first sub-group which are led to one of the energizing members and conductors of a second sub-group which are led to the other energizing member while the conductors of the said second group are altogether led to a single energizing member for the workpiece. Furthermore, the conductors of the second group in said assembly preferably comprises conductors of a first sub-group which are led to a first workpiece energizing member in contact with one surface of the workpiece and conductors of a second sub-group which are led to a second workpiece energizing member in contact with the opposite surface of the workpiece. The conductors of the said first sub-group in each group are preferably equal in number to the number of the conductors of the said second sub-group in the said group. The conductors of the said first group should also be equal in number to the number of the conductors of the said second group.

BRIEF DESCRIPTION OF THE DRAWING

These and other features of the present invention as well as advantages thereof will become more readily apparent from the following description when taken with reference to the accompanying drawing in which.

SPECIFIC DESCRIPTION

Figure 1:
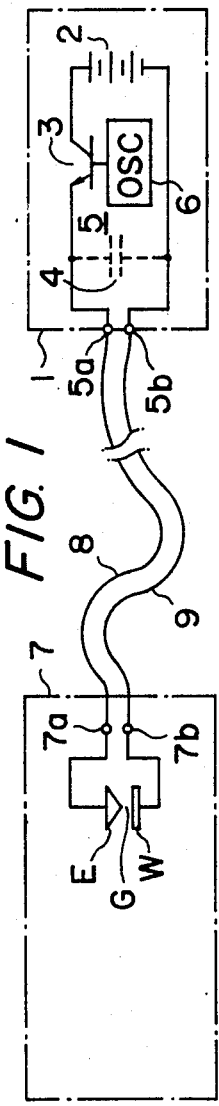
FIGS. 1 to 3 are circuit diagrams of various EDM circuit arrangements incorporating an improved conductor assembly and circuit connections according to the principles of the present invention.
Figure 2:
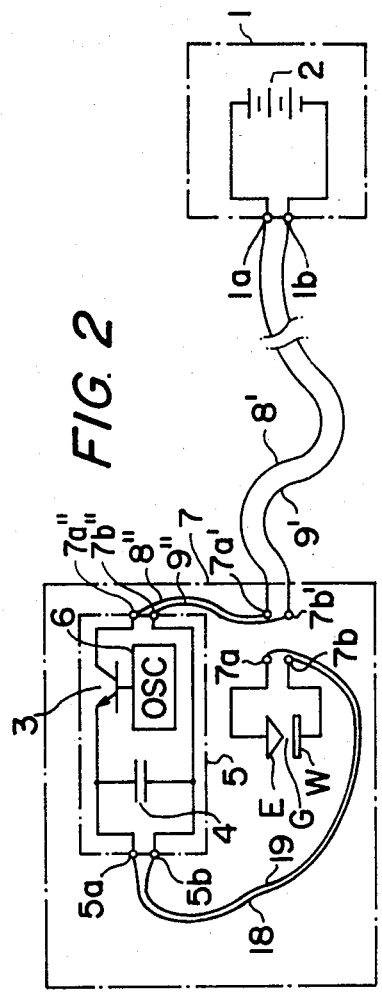
Figure 3:
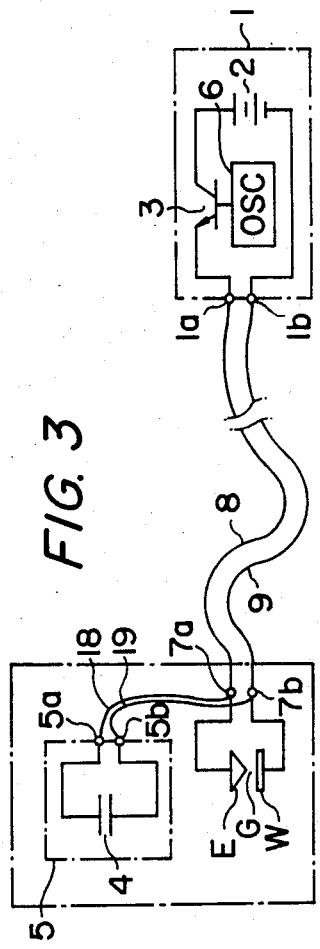

Referring now to FIGS. 1, 2 and 3, an EDM power supply 1 commonly includes a DC source 2 which together with a power switch 3 and/or a capacitor 4 constitutes an EDM pulse generator 5. The power switch 3, typically constituted by a bank of switching transistors, is alternately turned on and off by means of a control pulser or oscillator 6 in a conventional manner to produce a succession of discrete, time-spaced essentially unidirectional current pulses across a machining gap G formed between a tool electrode E and an electrically conductive workpiece W. The capacitor 4 is shown as connected in parallel to the DC source 11 and the machining gap G. The power switch 3 is shown as connected in series with the DC source 2 and the machining gap G. This switch is necessary if the capacitor 4 is omitted. If the capacitor 4 is employed, the switch 3 may be omitted. The capacitor 4 is alternately charged from the DC source and discharged through the machining gap G to provide a succession of discrete, time-spaced essentially unidirectional current pulses between the tool electrode E and the workpiece W. It is preferred to use both the switch 3 and the capacitor 4 connected as shown. The use of the capacitor 4 is desirable to ensure a high peak level of discharge current Ip during each pulse. The higher the peak level of current employed, the sharper the current rise and fall. The use of the switch 3 is desirable to ensure proper timing of discharge pulses.

The circuit arrangement of FIG. 1 basically employs a standard design of EDM equipment in which the DC source 2, the switch 3, the oscillator 6 and the capacitor 4 are all packaged as the pulse generator 5 in the power supply unit 1 which is accommodated in a cabinet separated from an EDM machine tool or proper 7 which carries mechanical components and the work vessel in which the machining gap G is defined between the tool electrode E and the workpiece W. Accordingly, elongate cables or conductors 8, 9 are required to connect the output terminals 1a, 1b of the power supply 1 or 5a, 5b of the pulse generator 5 with the electrode and workpiece terminals 7a, 7b on the machine tool 7. As mentioned previously, conductors according to the conventional design give rise to considerable power loss and waveform distortion of the generated discharge pulses.

It has been found that this problem which arises with the conventional circuit arrangement of FIG. 1 can be overcome by constructing and arranging the two conductors 8 and 9 in an improved assembly according to the present invention.

Figure 4:
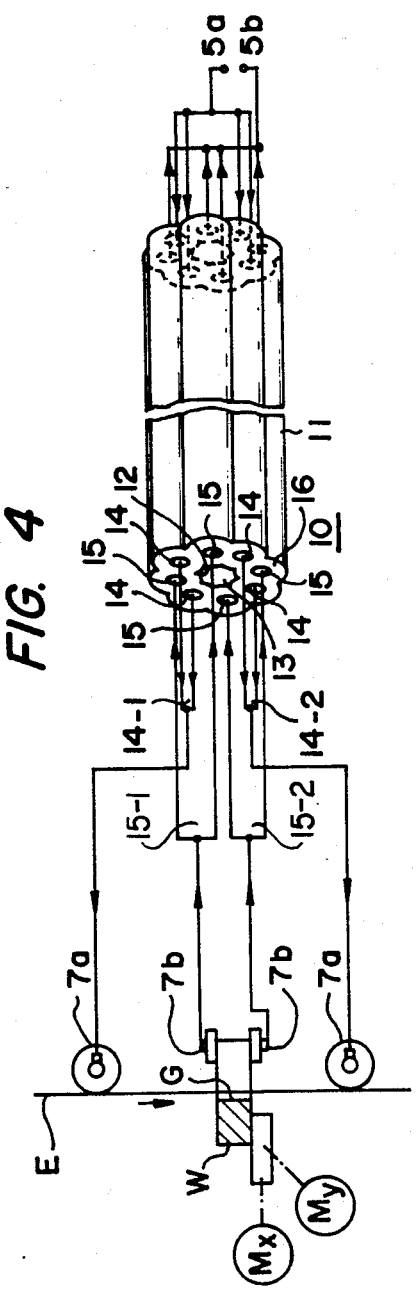
FIG. 4 is a diagrammatic perspective view illustrating the conductor assembly which may be employed in each of the circuit arrangements of FIGS. 1 to 3.

FIG. 4 shows an embodiment of the improved conductor assembly which is generally designated at 10. The assembly 10 is in the form of a tubular body having an outer, generally cylindrical surface 11 and an inner, generally cylindrical surface 12, the latter defining an internal bore 13 and being generally concentric with the outer surface 11. The body 10 comprises a first group of conductors 14 connected between one terminal 5a of the pulse generator 5 and the electrode terminal 7a to conduct the EDM current pulses in one direction and a second group of conductors 15 connected between the other terminal 5b of the pulse generator 5 and the workpiece terminal 7b to conduct the EDM current pulses in the opposite direction. The conductors 14, 15 are each a flexible wire of high conductivity, and are insulated from one another by, and embedded in a mutually parallel, equally spaced relationship in, a flexible, electrically nonconductive material 16. Thus, the parallel conductors 14 together make up the conductor 8 while the parallel conductors 15 together make up the conductor 9. According to the arrangement shown, the conductors 14, 15 are arranged in a circular or endless row with each conductor in one group being axially aligned always proximate with one conductor of the other group. Since each pair of adjacent conductors carry current pulses in the opposite directions, the magnetic field inductively produced about one of them is effectively cancelled by the magnetic field inductively produced about the other of them, thus minimizing the inductance of the assembly as a whole. In addition, the assembly 10 is constructed to form a tubular body (i.e. a body of a minimum volume and a maximum surface area) framed by the endless row of the conductors 14, 15 and contoured by the insulating material 16 along their outer and inner surfaces 11, 12 which are disposed for contact with a coolant fluid, e.g. air, gas or liquid to hold the conductors 14, 15 against temperature rise due to high-density pulse EDM current and hence against an adverse increase in their resistivity. The maximum surface area is thus advantageous for enhanced heat emission and heat absorption by the coolant to retain the present peak current of each EDM pulse as delivered to the machining gap while the minimum volume of the assembly is advantageous for space convenience. As a result, a markedly increased ratio of pulse peak current (Ip) to pulse duration ($\tau$on) is obtainable. The number of conductors of one group is preferably equal in number to conductors of the other group.

Figure 5:
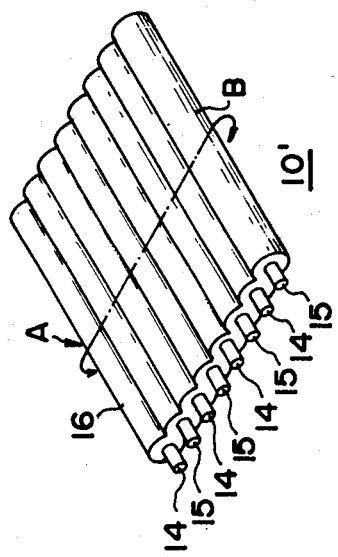
FIG. 5 is a diagrammatic perspective view illustrating a conductor assembly from which the assembly of FIG. 4 may be prepared.

Advantageously, the assembly 10 can be prepared from an assembly 10' in an elongate sheet form as shown in FIG. 5, comprising conductors 14, 15 covered with and separated by the insulating material 16. The pre-assembly 10' can be made by joining together parallel insulator-coated elongate conductors in a single row with a pair of ends A, B. The sheet-form assembly 10' is made into the tubular assembly 10 by joining the coated conductor 14 at one end A with the coated conductor 15 at the other end B of the sheet form as shown.

Figure 6:
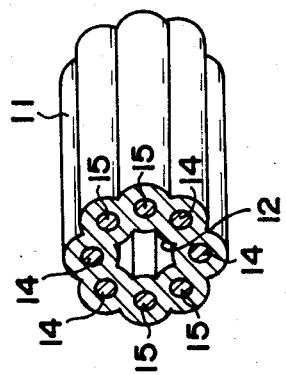
FIG. 6 is a diagrammatic cross-sectional view illustrating a modification of the arrangement of the assembly of FIG. 4.

FIG. 6 shows a modification of the arrangement of the tubular assembly in which a pair of conductors of one group and a pair of conductors of the other group are alternately arranged in the endless row so that each conductor of one group is aligned proximate with one (instead of two as in FIG. 4) conductor of the other group.

In FIG. 2 there is shown an improved EDM circuit arrangement in which the power switch 3, the control pulser 6 and the capacitor 4 are removed from the power supply cabinet 1 into the section of the machine tool 7 and arranged as a packaged unit of the EDM pulse generator 5 on the machine tool 7. The power supply unit 1 in this arrangement contains only the DC source 2 which is massive and bulky. Needless to say, the DC source 2 for EDM comprises a massive set of transformer, rectifier and choke. In this arrangement, while a pair of elongate conductors 8', 9' remain necessary to connect the output terminals 1a, 1b of the power supply 1 with input terminals 7a', 7b' at the machine tool 7, the conductors are required to carry the DC output and may thus be of the conventional design. The input terminals 7a', 7b' are shown as connected to the input terminal 7a'', 7b'' of the pulse generator 5 via a pair of conductor 8'', 9'' which may again be of the conventional design. The pulse generator 5 on the machine tool 7 is shown as having a pair of output terminals 5a, 5b which need be connected via conductors 18, 19 with the electrode and workpiece terminals 7a, 7b adjacent to the EDM gap G. Since the pulse generator 5 is arranged close to the EDM gap G, the stray inductance and resistance can be largely reduced. Nevertheless, the conductors 18, 19 when made of the conventional design still entail significant loss of EDM power and distortion of the EDM pulse waveform. Such loss of power and waveform distortion are virtually eliminated when the improved conductor assembly 10 as described is employed to constitute the conductors 18, 19.

In a further improved EDM circuit arrangement shown in FIG. 3, the charge and discharge capacitor 4 alone is located on the EDM machine proper 7 and adjacent the EDM gap G, and the separate power supply package 1 includes the DC source 2 and the power switch 3 with the control pulser 6. In this arrangement, the capacitor 4 constituting a direct EDM current pulse generator 5 has the output terminals 5a, 5b connected across the terminals 7a, 7b in parallel with both the EDM gap G and the terminals 1a, 1b. In this arrangement, conductors 18, 19 connecting the terminals 5a, 5b with the terminals 7a, 7b are constituted as the improved assembly 10 and conductors 8, 9 connecting the terminals 1a, 1b with the terminals 7a, 7b are optionally but preferably constructed as the improved conductor assembly 10 shown and described. In this manner, the EDM current pulses as delivered to the EDM gap become virtually free from any power loss and waveform distortion.

Referring again to FIG. 4, it should further be noted that in TW (traveling-wire) EDM systems, it is desirable that the traveling electrode wire E be energized, via energizing pin(s), roller(s) and/or like members in contact therewith, at two opposite sides of the workpiece W in the path of wire travel. Accordingly, the conductors of one group 14 arranged to energize the electrode wire E are arranged to comprise a first sub-group of conductors 14-1 which are led to one (e.g. upper) of the two wire energizing members and a second sub-group of conductors 14-2 which are led to the other (lower) wire energizing member while the conductors of the other group 15 are altogether led to a single energizing member for the workpiece W. Instead of the single workpiece energizing member, it has also been found desirable that two energizing members be provided for the workpiece W, one in contact with one surface (e.g. upper) of the workpiece and the other in contact with the other surface (e.g. lower) of the workpiece. Accordingly, the conductors of the other group 15 arranged to energize the workpiece W are likewise arranged to comprise a first sub-group of conductors 15-1 which are led to one (e.g. upper) workpiece energizing member and a second sub-group of conductors 15-2 which are led to the other (lower) workpiece energizing member. The conductors of the first sub-group 14-1, 15-1 in each group are preferably equal in number to the number of conductors of the second sub-group 14-2, 15-2 in the group. Moreover, it is desirable that the conductors of the first sub-group 14-1, 15-1 in each group 14, 15 be those closer in space to the one wire or workpiece energizing member and the conductors of the second sub-group 14-2, 15-2 in that group be those closer in space to the other wire or workpiece energizing member, as illustrated.

What is claimed is:
1. An EDM circuit arrangement, comprising:
an EDM pulse generator having a pair of terminals for providing a succession of EDM current pulses across a machining gap between a tool electrode and an electrically conductive workpiece;

a plurality of first conductors electrically connecting one said terminal and said tool electrode to conduct said current pulses in one direction;

a plurality of second conductors electrically connecting said other terminal and said workpiece to conduct said current pulses in the other direction; and each of said first and second conductors being individually enclosed in a generally cylindrical sleeve of insulating material, said insulated conductors being tangentially joined together in parallel, annularly adjacent relation to form a hollow cylindrical assembly wherein, except for the tangential junctions with adjacent insulated conductors, the surface of the insulation sleeve of each said conductor is exposed for contact with a cooling fluid at outer and inner generally concentric surfaces of said cylindrical assembly, each said first conductor being annularly adjacent one said second conductor in said assembly.

2. The EDM circuit arrangement defined in claim 1 wherein said pulse generator comprises a capacitor intermittently chargeable from a DC source for pulsing the output thereof to produce said succession of EDM current pulses, said DC source being accommodated in a power supply cabinet spaced from an EDM machining tool having said tool electrode and said workpiece accommodated therein, said capacitor being disposed in said machine tool and having said pair of terminals connected via said conductor-assembly with members energizing said tool electrode and said workpiece respectively.

3. The EDM circuit arrangement defined in claim 1 wherein said tool electrode is a wire like electrode continuously travelling through said workpiece and energized by a pair of energizing members disposed in contact with the travelling wire-like electrode and at two opposite sides of the workpiece and wherein said first conductors are divided into a first group for connection to one of said energizing members and a second group for connection to the other energizing member and said second conductors are connected to at least one energizing member for said workpiece.

4. The EDM circuit arrangement defined in claim 3 wherein the conductors of said first group are equal in number to the number of the conductors of said second group.

5. The EDM arrangement defined in claim 4 or 1 wherein the number of said first conductors are equal to the number of said second conductors.

6. In an EDM circuit arrangement wherein an EDM pulse generator having a pair of terminals for providing a succession of EDM current pulses is electrically connected across a machining gap between a tool electrode and an electrically conductive workpiece, the improvement comprising a low impedance electrical conductor including a plurality of electrical conductors each being separately insulated by a generally cylindrical sleeve of insulation, said conductors being disposed in parallel relation and tangentially joined together in a hollow cylindrical assembly defining outer and inner generally concentric surfaces wherein, except for the tangential junctions with adjacent insulated conductors, the surface of the insulation sleeve of each said conductor is exposed for contact with cooling fluid, said conductors being equally divided between a first group electrically connecting one of said pair of terminals with said tool electrode to conduct current pulses in one direction and a second group electrically connecting the other of said pair of terminals and said workpiece to conduct current pulses in the other direction, each conductor in said first group being annularly adjacent one conductor in said second group.

7. The EDM circuit arrangement defined in claim 6 wherein said pulse generator comprises a power switch and switching control circuit for pulsing the output of a DC source to produce a succession of voltage pulses eventually resulting in said succession of EDM current pulses, the pulse generator constituted by said power switch and said switching control circuit being disposed in a machine tool having said tool electrode and said workpiece accommodated therein, said DC source being accommodated in a power supply cabinet spaced from said machine tool, said pulse generator having said terminals connected via said conductor assembly with members energizing said tool electrode and said workpiece respectively.

8. The EDM circuit arrangement defined in claim 7 wherein said pulse generator in said machine tool further comprises a capacitor chargeable by said voltage pulses and dischargeable through said EDM gap to produce said succession of EDM current pulses, said capacitor being electrically connected in series with said power switch and said DC source and having said terminals connected via said conductor assembly with said terminals energizing said tool electrode and said workpiece respectively.

9. The circuit arrangement of claim 6 wherein each conductor in said first group is annularly adjacent two conductors in said second group.

* * * * *